United States Patent [19]

Cooper

[11] Patent Number: 5,298,637
[45] Date of Patent: Mar. 29, 1994

[54] PROCESS FOR PRODUCING A REDUCED CALORIE LIPID COMPOSITION

[75] Inventor: Charles F. Cooper, Paoli, Pa.

[73] Assignees: Arco Chemical Technology, L.P., Wilmington, Del.; CPC International Inc., Englewood Cliffs, N.J.

[21] Appl. No.: 964,815

[22] Filed: Oct. 22, 1992

[51] Int. Cl.$^5$ ............................................. C11C 3/02
[52] U.S. Cl. .................................. 554/169; 554/157
[58] Field of Search ................. 554/168, 169, 30, 157

[56] References Cited

U.S. PATENT DOCUMENTS

| | | | |
|---|---|---|---|
| 2,442,535 | 3/1946 | Eckey | 260/410.7 |
| 2,610,125 | 9/1952 | Valko | 99/123 |
| 2,625,484 | 1/1953 | Dominick et al. | 99/118 |
| 2,625,485 | 1/1953 | Dominick et al. | 99/118 |
| 2,625,486 | 1/1953 | Nelson et al. | 99/118 |
| 2,625,487 | 1/1953 | Nelson et al. | 99/118 |
| 2,733,125 | 1/1956 | Hawley et al. | 260/410.7 |
| 3,337,595 | 8/1967 | Lamont | 260/410.6 |
| 3,353,964 | 11/1967 | Selden | 99/118 |
| 4,517,360 | 5/1985 | Volpenhein | 536/119 |
| 4,747,969 | 5/1988 | Rupilius | 260/415 |
| 4,849,242 | 7/1989 | Kershner | 426/601 |
| 4,861,613 | 8/1989 | White et al. | 426/611 |
| 4,895,681 | 1/1990 | Herrmann et al. | 260/410.6 |
| 4,942,228 | 7/1990 | Gibson | 536/119 |
| 4,983,329 | 1/1991 | Cooper | 260/410.7 |
| 5,059,443 | 10/1991 | Ennis et al. | 426/531 |
| 5,077,073 | 12/1991 | Ennis et al. | 426/531 |
| 5,118,448 | 6/1992 | Cooper | 554/168 |
| 5,135,683 | 8/1992 | Cooper | 554/151 |
| 5,175,323 | 12/1992 | Cooper | 554/164 |

FOREIGN PATENT DOCUMENTS

| | | |
|---|---|---|
| 0353928 | 2/1990 | European Pat. Off. . |
| 0396405 | 11/1990 | European Pat. Off. . |
| 0396406 | 11/1990 | European Pat. Off. . |
| 0433016 | 6/1991 | European Pat. Off. . |
| 0481717 | 10/1991 | European Pat. Off. . |
| 0481523 | 4/1992 | European Pat. Off. . |
| 15953692 | 4/1970 | Fed. Rep. of Germany . |
| 207070 | 2/1984 | Fed. Rep. of Germany . |
| 55-79313 | 6/1980 | Japan . |
| WO9110368 | 7/1990 | PCT Int'l Appl. . |

OTHER PUBLICATIONS

Mieth et al., *Die Nahrung* 27(9), 853(1983).
Aust et al., *Die Nahrung* 32(1), 49(1988).
Sonntag, "Fat Splitting, Esterification and Interesterification," in *Bailey's Industrial Oil and Fat Products*, vol. 2, 4th Ed. Chapter 2, pp. 147–173 (1982).
Sreenivas An. *J. Am. Oil Chem.* 55, 796–805 (1978).

*Primary Examiner*—José G. Dees
*Assistant Examiner*—Samuel Barts
*Attorney, Agent, or Firm*—Stephen D. Harper

[57] ABSTRACT

A convenient method of obtaining an esterified alkoxylated polyol composition containing long chain saturated linear acyl groups which avoids the use of free $C_{20}$–$C_{24}$ fatty acids is provided. The method yields a reduced calorie admixture of a substantially digestion-resistant esterified alkoxylated polyol and a digestible fatty acid triglyceride.

21 Claims, No Drawings

PROCESS FOR PRODUCING A REDUCED CALORIE LIPID COMPOSITION

FIELD OF THE INVENTION

This invention relates to methods whereby reduced calorie fat substitutes may be conveniently and economically prepared. More specifically, the invention pertains to a synthetic process wherein a triglyceride which is relatively rich in $C_{20}$–$C_{24}$ saturated linear acyl groups is reacted with an esterified alkoxylated polyol which is relatively rich in $C_6$–$C_{18}$ acyl groups so as to achieve interchange of the acyl groups between the glyceride and alkoxylated polyol fragments.

BACKGROUND OF THE INVENTION

A wide variety of substances have been proposed for use as fat substitutes in food compositions. The chemical structures of such substances are selected such that they are more resistant to breakdown by the metabolic processes of the human digestive system which normally occur upon ingestion of conventional triglyceride lipids. Because of their increased resistance to digestion and absorption, the number of calories per gram available from the fat substitutes is considerably reduced as compared to common vegetable oils, animal fats, and other lipids. The use of such substances thus enables the preparation of reduced calorie food compositions useful in the control of body weight.

U.S. Pat. No. 4,861,613 (incorporated herein by reference in its entirety) describes one class of particularly useful fat substitutes wherein a polyol such as glycerin is alkoxylated with an epoxide such as propylene oxide and then esterified with any of a number of fatty acids or fatty acid derivatives to form an esterified alkoxylated polyol. These substances have the physical and organoleptic properties of conventional triglyceride lipids, yet are significantly lower in available calories than edible oils owing to their pronounced resistance towards absorption and pancreatic lipase enzymatic hydrolysis. The thermal and oxidative stability of the esterified alkoxylated polyols renders them especially suitable for use in the preparation of reduced calorie food compositions requiring exposure to high temperatures such as fried or baked foods.

Unfortunately, as a consequence of their hydrolytic stability and low digestibility, the esterified alkoxylated polyols described in U.S. Pat. No. 4,861,613 may tend to cause certain undesirable gastrointestinal side effects when consumed at high levels in the diet. That is, since such esterified alkoxylated polyols are not readily broken down into simpler substances upon ingestion, they largely retain their oily, fat-like character and pass through the digestive tract in substantially unaltered form. Non-digestible fat substitutes in general often function as laxatives in much the same manner as mineral oil. Problems with diarrhea, leakage of the fat substitute through the anal sphincter, separation of the fat substitute as an oil from the excreted fecal matter, and shortened bowel transition times resulting in gastrointestinal discomfort can occur as a result of the non-digestibility of the fat substitutes. Other fat substitutes which are similarly resistant towards digestion are known to produce such gastrointestinal side effects. Examples include sucrose polyester which is esterified with up to 8 fatty acid groups; see U.S. Pat. Nos. 3,954,976, 4,005,195, 4,005,196, and 5,006,360. Obviously, such problems will greatly limit the maximum usage level of these substances which can be tolerated in various food compositions, thereby constraining the amount of conventional triglyceride and the number of calories which can be removed from certain foods.

One solution to this problem is provided in copending application Ser. No. 07/880,538, filed May 20, 1992, and entitled "Esterified Propoxylated Glycerin Fat Substitute Compositions Resistant to Gastrointestinal Side Effects" (incorporated herein by reference in its entirety). The copending application describes a fatty acid-esterified propoxylated glycerin composition useful as a reduced calorie fat substitute resistant to gastrointestinal side effects having an average number of oxypropylene units per equivalent of glycerin of from 3 to 20, a fatty acid acyl group content such that at least 40 mole percent of the fatty acid acyl groups in the composition are derived from a $C_{20}$–$C_{24}$ saturated linear fatty acid, and a solid fat index at 27° C. as measured by dilatometry of at least 30. The utilization of such a composition in combination with a conventional fully digestible fatty acid triglyceride fat or oil in a food composition normally containing a fatty component is also described. The copending application suggests that these fatty acid-esterified propoxylated glycerin compositions may be obtained by first propoxylating glycerin with the desired number of equivalents of propylene oxide and then esterifying with a fatty acid or a fatty acid equivalent such as a fatty acid ester, fatty acid halide, or a fatty acid anhydride.

The use of fatty acid esters in such an esterification step is described in copending application Ser. No. 07/227,048, filed Aug. 1, 1988, entitled "Preparation of Esterified Propoxylated Glycerin by Transesterification" (incorporated herein by reference in its entirety). The fatty acid esters employed in this process are $C_1$ to $C_4$ alkyl esters of saturated or unsaturated $C_{10}$ to $C_{24}$ fatty acids. The esterification reaction is readily driven to completion by removing the $C_1$ to $C_4$ alkyl alcohol generated during the transesterification reaction by distillation or similar means. Although this approach works well on a laboratory scale and affords a high yield of esterified alkoxylated polyol with minimal by-products or color formation, it suffers from the practical disadvantage that the required $C_1$ to $C_4$ alkyl esters are relatively expensive as compared to the corresponding free fatty acids. In addition, great care must be taken to ensure that all of the residual $C_1$–$C_4$ alkyl alcohol formed is removed from the product prior to use in a food composition since certain alcohols of this type (reethanol, for example) are considered harmful when ingested.

However, if the $C_{20}$–$C_{24}$ saturated linear fatty acid acyl groups in the esterified propoxylated glycerin compositions of copending Ser. No. 07/886,538 are introduced using the corresponding free fatty acids rather than the $C_1$–$C_4$ alkyl esters in order to reduce the overall cost of the esterification, certain other processing problems are encountered. In particular, a direct esterification process must generally be run at a higher temperature than a transesterification process, especially when the only catalytic effect is from the excess fatty acid present. Additionally, a fairly large excess (10–20 % molar excess) of fatty acid relative to the initial hydroxyl concentration must be utilized in order to self-catalyze the reaction and to accomplish complete or near-complete esterification of the propoxylated glycerin. As a consequence, the excess fatty acid which remains at the completion of the esterification must be removed prior to formulation of the fat substitute into a food composition, as the excess fatty acid will cause severe taste, odor, and stability problems. A convenient way to remove the excess fatty acid is by vacuum steam stripping the acids away from the esterified propoxylated glycerin composition. This procedure is quite difficult to accomplish when $C_{20}$–$C_{24}$ saturated linear fatty acids are employed since such acids are relatively high melting (typically, over 74° C.) and consequently readily form troublesome plugs in commercial processing equipment. At times, particularly in vacuum equipment, even steam tracing is not an effective solution due to temperature-lowering effects in the vacuum eductor. As a result, it is often nearly impossible to carry out a large scale non-catalyzed direct esterification of a propoxylated glycerin intermediate with $C_{20}$–$C_{24}$ saturated linear fatty acids without having to frequently shut down to remove plugs of unreacted fatty acid. If a transition metal esterification catalyst such as a zinc, titanium, or tin compound compound is utilized so as to permit the use of a stoichiometric amount of fatty acid relative to propoxylated glycerin, quantitative removal of the metal catalyst following esterification is often quite difficult to achieve. To be useable as a reduced calorie fat substitute in food compositions, however, the esterified alkoxylated polyol must be essentially free of such metallic impurities.

SUMMARY OF THE INVENTION

This invention provides a process for producing a reduced calorie lipid (i.e., fat-like or oil-like) composition comprising contacting a triglyceride containing at least one $C_{20}$–$C_{24}$ saturated linear acyl group with an esterified alkoxylated polyol containing at least one $C_6$–$C_{18}$ acyl group in the presence of a basic catalyst for a time and at a temperature effective to accomplish interchange of at least one of the $C_{20}$–$C_{24}$ saturated linear acyl groups and at least one of the $C_6$–$C_{18}$ acyl groups. The reduced calorie lipid composition thus obtained is an admixture of a digestible modified triglyceride (e.g., a fatty acid triester of glycerin) and a fatty acid esterified alkoxylated polyol having an acyl group content such that a desirably high proportion of the acyl groups are derived from $C_{20}$–$C_{24}$ saturated linear fatty acids.

The incorporation of $C_{20}$–$C_{24}$ saturated linear fatty acids into the esterified alkoxylated polyol component at high levels renders it better tolerated in the digestive tract, as described in the aforementioned copending application. At any level, however, $C_{20}$–$C_{24}$ saturated linear acyl groups have the beneficial effect of increasing the melting or solidification point of an esterified alkoxylated polyol. This increase in melting point may be utilized to help counteract the effect of introducing higher proportions of oxyalkylene groups in an esterified alkoxylated polyol composition. That is, an increasing degree of propoxylation (number of moles of propylene oxide reacted per mole of polyol) tends to enhance the non-digestibility and lower the available caloric content of an esterified alkoxylated polyol but also generally depresses the melting point of such a composition. The solid fat index of the composition at a given temperature may consequently be too low for the composition to be directly substitutable for a conventional high-melting triglyceride in a margarine, shortening, cheese, or hard butter (confectionary) application. Increasing the proportion of $C_{20}$–$C_{24}$ saturated linear acyl groups relative to shorter chain, branched, and/or unsaturated acyl groups will favorably affect the melting characteristics of such compositions.

A distinct advantage of the present invention is that it completely avoids the use of free $C_{20}$–$C_{24}$ saturated linear fatty acids in a direct esterification step, thereby minimizing the handling and processing problems which are otherwise encountered. The starting triglyceride may be conveniently obtained by hydrogenation of a readily available natural fat or oil such as rapeseed or meadowfoam oil, while the preparation of the starting esterified alkoxylated polyol uses more tractable saturated or unsaturated $C_6$–$C_{18}$ fatty acids.

DETAILED DESCRIPTION OF THE INVENTION

Triglycerides suitable for use in the process of this invention include naturally occurring or synthetically prepared triesters of glycerin containing the desired proportion of $C_{20}$–$C_{24}$ saturated linear acyl groups. All of the acyl groups are attached directly by means of ester linkages to a glyceryl backbone. Since the triglyceride functions as the source of the $C_{20}$–$C_{24}$ saturated linear acyl groups which are transferred to the esterified alkoxylated polyol during operation of the process, the triglyceride is selected such that it contains a suitably high level of such acyl groups. While at least one of the acyl groups of the triglyceride must be a $C_{20}$–$C_{24}$ saturated linear acyl groups, in a preferred embodiment the triglyceride has at least two groups having this structure. All three of the acyl groups may be $C_{20}$–$C_{24}$ saturated linear acyl groups as is found, for example, in triglycerides of behenic (docosanoic) acid, arachidic (eicosanoic) acid, n-heneicosanoic acid, n-tricosanoic acid, and/or lignoceric (tetracosanoic) acid mixtures of triglycerides can also be employed. Preferably, the triglyceride mixture has an acyl group content such that at least 40 mole percent (more preferably, at least 50 mole percent) of the acyl groups are $C_{20}$–$C_{24}$ saturated linear acyl groups(i.e., acyl groups which would yield $C_{20}$–$C_{24}$ saturated linear fatty acids upon hydrolysis of the triglyceride mixture).

Suitable $C_{20}$–$C_{24}$ saturated linear acyl groups include those moieties corresponding to the general structure

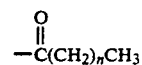

wherein n is an integer from 18 to 22. The triglyceride may also contain acyl groups other than the required $C_{20}$–$C_{24}$ saturated linear acyl group, in addition to the glyceryl moiety

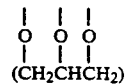

to which the acyl groups are covalently connected. These other acyl groups may be saturated or unsaturated (mono-, di-, tri-, paly-), branched or linear, and may contain from 8 to 24 carbon atoms.

To minimize the costs associated with the operation of this invention, it is particularly desirable to employ a triglyceride mixture readily obtainable from a natural animal or vegetable source of oil or fat with minimal processing or purification. For example, many Cruciferous plants produce seeds in which erucic acid (a monounsaturated $C_{22}$ fatty acid) is a major or main constituent of the triglycerides found therein. These Cruciferae seed fats and oils may be readily hydrogenated to provide triglycerides having a desirably high proportion of $C_{22}$ saturated linear acyl groups. Because the ingestion of triglycerides containing erucic acid has been associated with adverse physiological effects, it will generally be advantageous to accomplish substantially complete hydrogenation of these naturally occurring lipids. Preferably, the iodine value is reduced to less than 5 (most preferably, less than 1). Suitable hydrogenation techniques are well-known to those skilled in the art (see, for example, R. R. Allen, "Hydrogenation", in *Bailey's Industrial Oil and Fat Product*, Vol. 2, Fourth Edition, Chapter 1) (1982).

Illustrative examples of seed fats which can be utilized to provide triglycerides or triglyceride mixtures useful in the practice of this invention include, but are not limited to, lipids obtainable from plants such as *Brassica alba* (yellow mustard; ca. 7–8 wt. % $C_{20}$ acyl groups and ca. 44–46 wt. % $C_{22}$ acyl groups), *Brassica campestris* (turnip rape, colza; ca. 3–12 wt. % $C_{20}$ acyl groups and ca. 40–60 wt. % $C_{22}$ acyl groups), *Brassica juncea* (mustard; ca. 45 wt. % $C_{22}$ acyl groups), *Brassica nigra* (black mustard; ca. 8–9 wt. % $C_{20}$ acyl groups and ca. 43–44 wt. $C_{22}$ acyl groups), *Brassica napus* (rape), *Cherianthus cheiri* (wallflower; ca. 38–43 wt. % $C_{22}$ acyl groups), *Coringia orientalis* (hare's ear mustard; ca. 10 wt. % $C_{20}$ acyl groups and ca. 35–45 wt- % $C_{22}$ acyl groups), *Erucastrum strigosum* (ca. 48 wt. % $C_{22}$ acyl groups), *Eruca sativa* (jambo rape; ca. 11–12 wt. % $C_{20}$ acyl groups and ca. 37–38 wt. % $C_{22}$ acyl groups), *Allieria officinalis* (garlic mustard; ca. 75% $C_{22}$ acyl groups), *Sisymbrium allieria* (ca. 47% $C_{22}$ acyl groups) and *Thlaspe arvense* (fanweed; ca. 0–7 wt. % $C_{20}$ acyl groups, ca. 37–49 wt. % $C_{22}$ acyl groups, and ca. 0–4 wt. % $C_{24}$ acyl groups). The seed fats of the Tropaeolum (nasturtium) family also contain high proportions of erucic acid oils (up to 80 wt. %). High erucic acid oils from *Crambe abyssinica* and *Crambe hispanica* (ca. 52–57 wt. % 22:1 fatty acid content) could also be used after hydrogenation. Another excellent source of $C_{20}$–$C_{24}$ linear fatty acids is the hydrogenated oil from the seeds of *Limnathes douglasii* (meadowfoam; ca. 63 wt. % $C_{20}$ acyl groups and ca. 34 wt. % $C_{22}$ acyl groups). Various fish and marine fats and oils such as whale oil, sardine oil, menhaden oil, herring oil, and the like also contain significant amounts of $C_{20}$, $C_{22}$, and $C_{24}$- containing triglycerides and therefore may find utility in the present invention. Due to its availability and relatively low cost, fully hydrogenated high erucic rapeseed oil is especially preferred for use as the source of triglyceride in the process of this invention.

The other necessary reactant in the process of this invention is an esterified alkoxylated polyol having $C_6$–$C_{18}$ acyl groups (which may be saturated or unsaturated, branched or linear) contained therein. Since one of the objects of the invention is to modify the physical and physiological properties of the esterified alkoxylated polyol by incorporating a higher proportion of $C_{20}$–$C_{24}$ saturated linear acyl groups therein, it will generally be desirable to utilize as a starting material a material having few or no such acyl groups. Esterified alkoxylated polyols have been developed in recent years for use as reduced calorie fat substitutes in food compositions and are characterized by having oxyalkylene units interspersed between attachment sites on a polyol residue (which typically is derived from a polyhydric aliphatic compound) and terminal long chain acyl groups derived from fatty acids. Certain of the acyl groups may be advantageously attached directly to the polyol residue as described in U.S. Pat. Nos. 5,118,448 and 5,135,683 and European Pat. Publ. No. 481,523. The oxyalkylene units favorably influence the caloric availability and/or physical properties of these substances as compared to analogous substances wherein the polyol residue and all of the acyl groups are directly connected. Illustrative esterified alkoxylated polyols usable in the process of this invention are described, for example, in the following publications, the teachings of which are incorporated herein by reference in their entirety: U.S. Pat. Nos. 4,861,613 (White et al.), 4,983,329 (Cooper), 5,118,448 (Cooper), 5,135,683 (Cooper), 4,849,242 (Kershner), 5,059,443 (Ennis et al.), and 5,077,073 (Ennis et al.); European Pat. Pub. Nos.. 481,523 (Sekula), 353,928 (Cooper), and 481,717 (Cooper). Methods for preparing such substances are also well-known and are provided in the foregoing publications.

In an especially preferred embodiment of the invention, the esterified alkoxylated polyol is comprised of a polyol residue derived from a polyhydric aliphatic compound (i.e., an organic compound containing two or more hydroxyl groups), and from 2 to 8 fatty acid-esterified oxyalkylene groups attached to said polyol residue (through ether linkages). Said fatty acid-esterified oxyalkylene groups preferably have the structure

wherein OA is an oxyalkylene unit derived from a $C_2$–$C_{10}$ epoxide, n is from 1 to 20 and

is an acyl group derived from a $C_6$–$C_{18}$ saturated or unsaturated fatty acid. The polyhydric aliphatic compound may be selected from $C_2$–$C_{10}$ aliphatic diols (e.g., ethylene glycol, propylene glycol, 1,3-propanediol, 1,4-butanediol, 1,2-butanediol, 2,3-butanediol, pinacol, 1,2-cyclohexanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 1,4-cyclohexanediol, 1,7-heptanediol, 2-methyl-2-propyl-1,3-propanediol, 2,2-diethyl-1,3-propanediol, 2,4-dimethyl-2,4-pentanediol, 2-ethyl-1,3-hexanediol, 1,2-octanediol, 1,8-octanediol, 2,2,4-trimethyl-1,3-pentanediol, and the like), $C_3$–$C_2$ aliphatic triols (e.g., glycerin, 1,2,4-butanetriol, 2,3,4-pentanetriol, 2-ethyl-2-(hydroxymethyl)-1,3-propanediol, 1,1,1-tris(hydroxymethyl) ethane, 1,2,6-trihydroxyhexane, 1,2,3-heptanetriol, and the like), pentaerythritol, sugar alcohols [including those compounds corresponding to the formula $HOCH_2(CHOH)_nCH_2OH$ wherein n is 2 to 6 such as erythritol, xylitol, sorbitol, arabitol, mannitol, and the like], monosaccharides (e.g., erythrose, threose, ribose, arabinose, xylose, lyxose, allose, altrose, glucose, mannose, gulose, idose, galactose, fructose, galactose, and the like), disaccharides (e.g., sucrose, lactose, maltose), and alkyl glycosides (e.g., methyl glycosides, ethyl glycosides, propyl glycosides, and other glycoside compounds wherein the alkyl glycoside is an acetal I(/formed by interaction of a $C_1$–$C_{20}$ alcohol with a carbonyl group of a mono- or disaccharide such as glucose). Most preferably, the polyhydric aliphatic compound is glycerin (also known as glycerol). The value of n (the number of oxyalkylene units per acyl group) in each fatty acid-esterified oxyalkylene group will preferably vary from 1 to 20, but can be manipulated as desired to alter the resistance of the final reduced calorie lipid composition towards digestion and metabolic breakdown as well as the physical properties and characteristics (e.g., melting point, viscosity, relative polarity, solid fat index) of said composition. When the polyhydric aliphatic compound is glycerin, n is preferably 1 to 6.

The oxyalkylene units ("OA") are preferably derived by ring-opening $C_2$–$C_{10}$ epoxides, especially aliphatic epoxides, such as ethylene oxide, propylene oxide, 1,2-butylene oxide, 2,3-butylene oxide (cis and/or trans), isobutylene oxide, 1,2-pentene oxide, 1,2-octene oxide, cyclohexene oxide, phenyl glycidyl ether, methyl glycidyl ether, ethyl glycidyl ether, styrene oxide, epichlorohydrin, allyl glycidyl ether, and the like. Due to their low cost, high reactivity, and favorable impact on esterified alkoxylated polyol fat substitute properties, the use of ethylene oxide, propylene oxide, 1,2-butene oxide or mixtures thereof (either in random or block fashion) is especially desirable. Each oxyalkylene unit has the general skeletal formula —C—C—O— containing two carbons and one oxygen. However, the oxyalkylene unit may be substituted with one or more alkyl, aryl, aralkyl, or other such substituent. In a preferred embodiment, the oxyalkylene units correspond to the structure

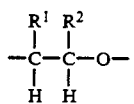

wherein $R_1$ and $R_2$ are the same or different and are hydrogen or a $C_1$–$C_6$ alkyl group such as methyl, ethyl, propyl, isopropyl, butyl, sec-butyl, iso-butyl, tert-butyl, pentyl, hexyl, cyclohexyl, and the like. Most preferably, one of $R^1$ or $R^2$ is methyl and the remaining R group is hydrogen. In one desirable embodiment, $R^2$ in the oxyalkylene group adjacent to the acyl group is a $C_1$–$C_6$ alkyl group since a secondary ester linkage resistant to enzymatic hydrolysis is thereby created.

The acyl group is nominally derived from a $C_6$–$C_{18}$ saturated or unsaturated fatty acid such as, for example, caprylic acid, caproic acid, capric acid, lauric acid, myristic acid, palmitic acid, palmitoleic acid, stearic acid, undecanoic acid, myristoleic acid, elaidic acid, pelargonic acid, heptadecanoic acid, pentadecanoic acid, tridecanoic acid, oleic acid, vaccenic acid, linoleic acid and linolenic acid. Different acyl groups may be incorporated into the same individual esterified alkoxylated polyol molecule. Mixtures of different esterified alkoxylated polyols varying in polyol residue content, the value of n, and acyl group content may also be utilized.

An especially preferred method for obtaining esterified alkoxylated polyols suitable for use in the practice of this invention is to alkoxylate the polyhydric aliphatic compound with the epoxide in the presence of a basic catalyst such as an alkali metal hydroxide or alkoxide to form an alkoxylated polyol. The alkoxylated polyol is then esterified (using, for example, either an excess of fatty acids or an appropriate catalyst) with a mixture of fatty acids obtained by hydrolytic splitting of a naturally occurring lipid or a fully or partially hydrogenated derivative thereof. Naturally occurring lipids which can be utilized to provide an appropriate source of $C_6$–$C_{18}$ fatty acids for this purpose include, for example, cottonseed oil, soybean oil, peanut oil, olive oil, safflower oil, sunflower oil, low erucic rapeseed oil, palm oil, palm kernal oil, tallow, lard, coconut oil, sesame oil, and corn oil.

While the relative amounts of the initial triglyceride and esterified alkoxylated polyol used in the process of this invention are not critical, generally speaking such amounts are adjusted so as to provide a reduced calorie lipid composition as the product of said process wherein the available caloric content is minimized. This is generally accomplished by maximizing the relative proportion of the esterified alkoxylated polyol component. At the same time, however, it will typically be desirable to transfer a sufficient number of $C_{20}$–$C_{24}$ saturated linear acyl groups from the triglyceride to the esterified alkoxylated polyol such that the latter component's tendency to provoke undesired gastrointestinal side effects is minimized and its melting profile is shifted upwards to an appropriate extent. In addition, the amount of triglyceride required for these purposes will be a function of its initial content of $C_{20}$–$C24$ saturated linear acyl groups. Generally speaking, however, the weight ratio of triglyceride to esterified alkoxylated polyol may be varied from 20:1 to 1:20.

The catalysts appropriate for use in the instant process will be those substances capable of catalyzing the desired transfer of acyl groups between the different starting components.

Such catalysts are typically basic in character and are preferably chosen from among those materials which are alkali metals, alkali metal compounds, alkaline earth compounds, or ammonium compounds or tertiary amines since such substances exhibit high activity, tend to cause few problems with the formation of undesired by-products or impurities, may be readily removed by conventional techniques after the desired degree of acyl group interchange is accomplished, and do not generally raise any unusual concerns with respect to toxicity or other harmful effects if minor amounts remain in the reduced calorie lipid composition product. Illustrative alkali metal, alkaline earth, or ammonium compounds which can be utilized include, but are not limited to ammonium, sodium, lithium, potassium, calcium, barium, or magnesium hydroxides, alkoxides (e.g., methoxides, ethoxides, salts of glycerin or other polyols such as diols, triols, tetrols, alkoxylated glycerin, other polyhydric substances), amides, carbonates, bicarbonates, hydrides, oxides, amides, carboxylates (e.g., fatty acid salts), phosphates, borates, sulfates, and the like. Alkali metals such as sodium metal (which may be in the form of a dispersion) or a sodium-potassium alloy may be employed. Suitable tertiary amines include, for example, pyridine, triethylamine, N,N-dimethylaniline, N-ethyl morpholine and the like. The amount of catalyst is not critical and the optimum concentration can be readily determined by routine experimentation. If the catalyst is an alkali metal or an alkali metal, alkaline earth, or ammonium compound, typically the concentration of alkali metal, alkaline earth, or nitrogen can suitably be in the range of from 50 to 10,000 parts per million based on the total combined weight of the triglyceride and the esterified alkoxylated polyol. When tertiary amines are utilized, catalyst concentrations of from 0.2 to 10 weight percent are generally appropriate.

In one embodiment of this invention, the basic catalyst which is required to accomplish acyl group interchange between the triglyceride and the esterified alkoxylated polyol is present in the esterified alkoxylated polyol as a result of the production of the esterified alkoxylated polyol itself. That is, the same alkali metal, alkali metal compound, alkalene earth compound, ammonium compound, or tertiary amine may be utilized to catalyze the alkoxylation reaction of a polyol with an epoxide to form an alkoxylated polyol intermediate and the esterification reaction of the alkoxylated polyol intermediate with a fatty acid or fatty acid ester of a $C_1$–$C_6$ alcohol to produce the esterified alkoxylated polyol as well as the subsequent acyl group interchange reaction. The originally charged basic catalyst is thus not removed prior to purification of the final desired reduced calorie lipid composition. This embodiment provides a convenient and economical process for the preparation of such compositions since tedious and costly catalyst removal steps as well as the total quantity of basic catalyst required are minimized.

The triglyceride and the esterified alkoxylated polyol are contacted in the presence of the basic catalyst for a time and at a temperature effective to accomplish transfer of at least one of the $C_{20}$–$C_{24}$ acyl groups present in the triglyceride to the esterified alkoxylated polyol. At the same time, at least one $C_6$–$C_{18}$ acyl group is transferred from the esterified alkoxylated polyol to the triglyceride replacing the $C_{20}$–$C_{24}$ saturated linear acyl group. The reaction conditions are selected such that the desired degree of acyl group interchange takes place within a practically short period of time (typically, from about 1 minute to 12 hours). Generally speaking, it will be desirable to interchange at least 20 mole percent of the $C_{20}$–$C_{24}$ saturated linear acyl groups with $C_6$–$C_{18}$ acyl groups. It has been found that the oxyalkylene units present in the esterified alkoxylated polyol component are not affected or degraded by operation of the process of this invention, thus ensuring that the final product will be suitable for use in food compositions.

Reaction temperatures of from 0° C. to 275° C. (more preferably, 50° C. to 200° C.) are normally suitable, although higher or lower temperatures could be utilized depending upon the activity of the catalyst. Although a solvent could be present in order to facilitate mixing, reduce viscosity, or aid in heat transfer, an important advantage of the process of this invention is that the use of a solvent is not required since both the triglyceride and the esterified alkoxylated polyol are typically relatively free-flowing liquids at the reaction temperatures normally employed. The components of the reaction mixture are preferably stirred, mixed, or agitated in a suitable reaction vessel in order to assure intimate contact on a molecular level and to facilitate the desired acyl group transfer reaction. The process of the invention is advantageously carried out under an inert atmosphere wherein air and oxygen are excluded in order to avoid oxidation of the reaction product. Unlike a conventional transesterification reaction of an alkoxylated polyol with $C_1$–$C_4$ alkyl esters of fatty acids, no by-products need be removed from the reaction vessel during operation of the present process. It may be desirable to treat the triglyceride and the esterified alkoxylated polyol so as to remove substantially all water or free fatty acids prior to contacting the mixture of these materials with the basic catalyst. These substances may act as catalyst poisons or otherwise interfere with the desired acyl group interchange reaction.

The reaction may be permitted to proceed until an equilibrium composition is attained wherein the different acyl groups are randomly distributed with respect to the different positions available for acyl group substitution in the triglyceride and the esterified alkoxylated polyol. This will maximize the $C_{20}$–$C_{24}$ acyl group content in the esterified alkoxylated polyol component of the reaction mixture. Alternatively, of course, the reaction may be halted at any point prior to reaching equilibrium by deactivating or removing the basic catalyst and/or cooling the mixture below the temperature at which acyl group interchange proceeds at a discernible rate.

A simplified illustration of the type of acyl group interchange achieved in the process of this invention is as follows, wherein compound A is the triglyceride of behenic acid and compound B is an esterified propoxylated glycerin having three $C_{18}$ monounsaturated acyl groups derived from oleic acid.

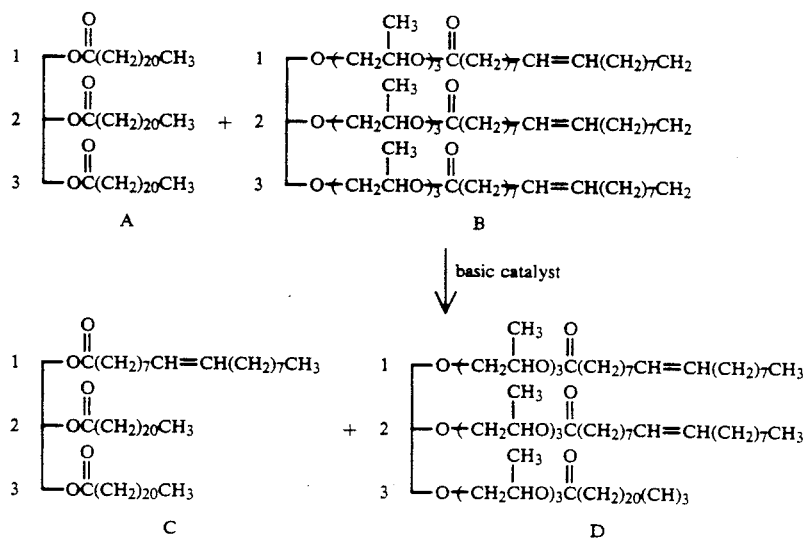

It may be seen that the net result of the acyl group interchange is the transfer of the $C_{22}$ saturated linear acyl group originally substituted on the 1 position of the triglyceride to the 3 position of the esterified propoxylated glycerin which was originally occupied by a $C_{18}$ monounsaturated acyl group. The transfer provides a mixture of new compounds C and D wherein C is a modified triglyceride and D is an esterified propoxylated glycerin having two $C_{18}$ acyl groups and one $C_{22}$ saturated linear acyl group.

If desired, the equilibrium distribution of acyl groups may be altered so as to even further enhance the relative proportion of $C_{20}$–$C_{24}$ saturated linear acyl groups substituted on the alkoxylated polyol. One suitable technique is fractional crystallization wherein a higher melting fraction enriched in $C_{20}$–$C_{24}$ saturated linear acyl groups is separated by crystallization from a lower melting fraction which is relatively lean in such acyl groups and which remains liquid at the crystallization conditions employed. The lower melting fraction after separation may be again subjected to an acyl group interchange reaction with a triglyceride relatively rich in $C_{20}$–$C_{24}$ saturated linear acyl groups. Another approach is to add a portion of free $C_{20}$–$C_{24}$ saturated linear fatty acids (e.g., behenic acid, arachidic acid, heneicosanoic acid, lignoceric acid, tricosanoic acid, and the like and mixtures thereof) to the equilibrium reaction mixture and carry out an acidolysis reaction while removing shorter chain lower boiling fatty acids from the mixture by means such as vacuum distillation. To accelerate the rate of the acidolysis reaction, it may be helpful to neutralize or remove the basic catalyst and to add an acidic catalyst such as sulfuric acid or a metallic catalyst such as a zinc soap or oxide. However, certain compounds such as calcium or magnesium oxide or hydroxide can be effectively used to catalyze both the acyl group interchange reaction and the acidolysis.

When the acyl group transfer reaction has proceeded to the extent desired, the basic catalyst may be removed or deactivated by any appropriate method. For example, if the basic catalyst is an alkali metal, alkali metal compound or alkaline earth compound, the reaction product can be contacted with a particulate absorbent such as magnesium or aluminum silicate at an appropriate temperature (typically, 50° C. to 150° C.) so as to absorb the catalyst onto the absorbent and then filtered. Alternatively, the reaction product can be treated with an acid such as a mineral acid (e.g., hydrochloric acid, sulfuric acid, phosphoric acid) or an organic acid (e.g., acetic acid, oxalic acid, citric acid, tartaric acid) so as to neutralize the basic catalyst. The neutralized catalyst typically forms a precipitate which can be removed by filtration. Treatment with an appropriate ion exchange resin or extraction with water or dilute aqueous acid may also be utilized. Where the basic catalyst is a tertiary amine or other relatively volatile substance, it can be removed by distillation or steam stripping (preferably, under vacuum).

The reduced calorie lipid composition produced by the process of this invention can be additionally purified or treated so as to render it suitable for use in food compositions using any of the techniques known in the art for refining natural vegetable or animal oils and fats. Such techniques include, but are not limited to, degumming, bleaching, filtration, deodorization, hydrogenation, deacidification, steam stripping, dewaxing, and the like. Various additives such as stabilizers, anti-oxidants, vitamins and so forth can also be incorporated into the reduced calorie lipid composition.

Reduced calorie lipid compositions produced in accordance with this invention can replace, in full or in part, conventional edible oils or fats in a cooking oil, frying oil, salad oil, or shortening, for example. Additional uses include combining the reduced calorie lipid composition with other foodstuff ingredients to form food compositions such as frozen desserts (e.g., sherbet, ice cream, frozen yogurt, milk shakes), baked goods (cakes, doughnuts, muffins, brownies, breads, pies, rolls, pastries, cookies, biscuits, crackers), nut butters (peanut butter), dairy products (margarine, sour cream, coffee lighteners, cheese, cheese spreads, flavored dips, filled cream, filled milk), mayonnaise, salad dressing, savory snacks (potato chips, corn chips, cheese puffs, pretzels, fried foods (fried poultry, fritters, fried pies, fried vegetables such as french fried potatoes, fried fish), reformed and comminuted meats (lunch meats, sausage, hot dogs, hamburger), pet foods, meat and egg substitutes or extenders, whipped toppings, gravies and other sauces, frostings, fillings, icings, cocoa butter replacements or blends, candies (especially those normally containing fatty ingredients such as chocolate or peanut butter), soups and dry baking mixes (for muffins, cakes, pancakes, waffles, brownies, and the like). Owing to the fat-like properties and stability of the reduced calorie lipid compositions, minimum reformulation of standard food compositions will generally be required. The viscosity, melting profile, yield point, hardness, thixotropic area, liquid/solid stability, solid fat index, and other physical properties of the reduced calorie lipid composition are preferably selected such that they mimic as closely as possible the analogous properties of the conventional triglyceride being replaced.

Illustrative ingredients which may be used in combination with the reduced calorie lipid compositions obtainable by practice of this invention include carbohydrates (flour, starches, sugars, celluloses, polydextrose or other bulking agents), edible lipids (triglycerides), proteins (from animal or vegetable sources), vitamins, antioxidants, emulsifiers, thickeners, preservatives, colorants, flavors, fragrances, sugar substitutes (saccharin, aspartame, sucralose, cyclamates, and the like), other fat substitutes or fat mimetics (for example, sucrose polyester or caprenin), water, milk, spices, eggs, and the like. oil-in-water to water-in-oil emulsions can be readily prepared by combining water, the reduced calorie lipid, and other ingredients such as emulsifiers. The reduced calorie lipid compositions of this invention are particularly suitable for the preparation of food compositions requiring exposure to elevated temperatures. Unlike other proposed fat substitutes such as proteinacious macrocolloids or certain polysaccharide-based substances requiring water to render them fat-like in texture, the lipid compositions produced by this invention are exceptionally stable thermally and do not readily decompose or lose their fat-like properties when heated. The compositions thus may readily be utilized in deep fat frying applications to prepare fried foods such a savory snacks, fried chicken, fried fish, french fries, and the like since they will function as effective heat transfer media (that is, they will transmit heat rapidly and uniformly to the food being fried and also provide crisping).

From the foregoing description, one skilled in the art can readily ascertain the essential characteristics of this invention and, without departing from the spirit and scope thereof, can make various changes and modifications of the invention to adapt it to various usages, conditions, and embodiments.

The following examples further illustrate the process of this invention, but are not limitative of the invention in any manner whatsoever.

EXAMPLE 1

This example demonstrates the preparation of an esterified propoxylated glycerin mixture which is relatively rich in $C_6$-$C_{18}$ acyl groups and which is useful as one of the starting materials in the practice of the instant invention. Propoxylated glycerin (382 parts by weight) having a number average molecular weight of about 382 and prepared by the potassium-catalyzed propoxylation of glycerin with 5 moles of propylene oxide per mole of glycerin is combined with 1050 parts by weight of a mixture of fatty acids obtained by hydrolytic splitting of soybean oil and having the approximate composition 0.1% myristic acid, 9.8% palmitic acid, 2.5% stearic acid, 0.4% palmitoleic acid, 28.9% oleic acid, 50.7% linoleic acid, and 6.5% linolenic acid. The mixture is heated to 250° C. under a reduced pressure nitrogen atmosphere. When conversion of the propoxylated glycerin hydroxyl groups is greater than 95%, the esterification reaction is stopped and the esterified propoxylated glycerin product steam refined at 1-3 mm pressure and 1-5% steam per hour until the residual acid value is ca. 0.3%.

EXAMPLE 2

This example demonstrates the preparation of a reduced calorie lipid composition in accordance with the process of the inventions. The esterified propoxylated glycerin product obtained in Example 1 (100 parts by weight) is combined with 100 parts by weight fully hydrogenated high erucic rapeseed oil (iodine value <1; acyl group content ca. 0.6 wt. % $C_{16}$, 37.1 wt. % $C_{18}$ 13.4 wt. % $C_{20}$, 48.1 wt. % $C_{22}$). The mixture is heated at 150° C. for 3 hours in the presence of sodium methoxide (0.6 parts by weight), then treated with magnesium silicate (20 parts by weight) for 1 hour at 110° C. to adsorb residual sodium. After filtering to remove the magnesium silicate containing adsorbed sodium, the reduced calorie lipid composition thus obtained is steam refined as in Example 1. Analysis of the product by high pressure liquid chromatography is utilized to show that the behenic triglyceride content of the product is significantly reduced as compared to the initial mixture of hydrogenated high erucic rapeseed oil and esterified propoxylated glycerin, indicating that substantial transfer of $C_{22}$ saturated linear acyl groups from the hydrogenated high erucic rapeseed oil component to the esterified propoxylated glycerin component has occurred. At equilibrium the level of behenic triglyceride is approximately one-half that of the original level. The lipid composition product is calculated to have an available caloric value of approximately 3.5 calories per gram as compared to the 9 calories per gram caloric value of a conventional partially hydrogenated vegetable shortening. The lipid composition product is also expected to have a reduced tendency to cause gastrointestinal side effects such as anal leakage as compared to the esterified propoxylated glycerin starting material due to the incorporation of $C_{22}$ saturated linear acyl groups into the esterified propoxylated glycerin.

EXAMPLE 3

The procedure of Example 2 is repeated except for the following changes:
Propoxylated glycerin—number average molecular weight about 670; prepared by reacting glycerin with 10 moles propylene oxide per mole glycerin
Initial esterified propoxylated glycerin—obtained by esterifying the above propoxylated glycerin with a 20% molar excess of stearic acid
Triglyceride—meadowfoam oil which has been hydrogenated to an iodine value of less than 5 (ca. 95% $C_{20}$-$C_{22}$ linear saturated acyl groups)

A reduced calorie lipid composition is obtained wherein ca. 40 mole % of the stearyl groups originally on the esterified propoxylated glycerin have been replaced by $C_{20}$-$C_{22}$ Saturated linear acyl groups.

EXAMPLES 4–13

Other specific embodiments of the invention are illustrated in Table I wherein various triglyceride mixtures and esterified alkoxylated polyol mixtures are reacted in differing proportions using a variety of basic catalysts.

TABLE 1

| Example No. | Triglyceride | | | Esterified Alkoxylated Polyol | | | | |
|---|---|---|---|---|---|---|---|---|
| | Source | % $C_{20}$-$C_{24}$[1] | pbw[2] | Polyol | Epoxide | Moles Epoxide/ Mole Polyol | Acyl Group Content | pbw |
| 4 | Canadian high erucic rapeseed oil | 54.2 | 75 | glycerin | ethylene oxide | 9 | a | 25 |
| 5 | crambe oil | 64.3 | 25 | 1,4-butanediol | 1,2-butene oxide | 4 | b | 75 |
| 6 | herring oil | 44 | 60 | trimethylolpropane | EO/PO[3] | 15 | c | 40 |
| 7 | menhaden oil | 28.4 | 40 | pentaerythritol | cyclohexene oxide | 6 | d | 60 |
| 8 | meadowfoam oil | 95.5 | 15 | sucrose | PO/BO[4] | 24 | e | 85 |
| 9 | yellow mustard oil | 53 | 50 | sorbitol | PO/EO[5] | 24 | f | 50 |
| 10 | wallflower oil | 43 | 45 | methyl glucoside | propylene oxide | 12 | g | 55 |
| 11 | fanweed oil | 49 | 55 | 2,3-butanediol | 1,3-pentene oxide | 8 | h | 45 |
| 12 | ravison oil | 46.7 | 35 | 2,3,4-pentanetriol | methyl glycidyl ether | 7 | i | 65 |
| 13 | Polish rapeseed oil | 59.3 | 30 | glucose | 1,2-octene oxide | 10 | j | 70 |

| Example | Acyl Group Interchange Conditions |
|---|---|

TABLE 1-continued

| No. | Basic Catalyst | pbw | time, hr. | temp. °C. |
|---|---|---|---|---|
| 4 | potassium glycerate | 0.4 | 1.5 | 175 |
| 5 | sodium hydroxide | 1 | 0.5 | 225 |
| 6 | sodium stearate | 0.75 | 1.0 | 250 |
| 7 | sodium dispersion (in xylene) | 0.5 | 2.0 | 95 |
| 8 | potassium hydroxide | 2 | 4.0 | 200 |
| 9 | sodium hydride | 0.7 | 0.5 | 100 |
| 10 | potassium hydride | 1.0 | 0.25 | 170 |
| 11 | calcium oxide | 3.0 | 5.0 | 200 |
| 12 | sodium amide (in toluene) | 1.0 | 4.0 | 60 |
| 13 | Na—K alloy 50/50 wt/wt | 0.5 | 0.5 | 100 |

TABLE 1—FOOTNOTES a. mixture of fatty acids obtained by hydrolytic splitting of palm kernel oil (ca. 0.2 wt. % caproic acid, 4.8 wt. % caprylic acid, 6.6 wt. % capric acid, 44.1 wt. % lauric acid, 15.4 wt. % myristic acid, 8.5 wt. % palmitic acid, 2.7 wt. % stearic acid, 0.2 wt. % arachidic acid, 16.1 wt. % oleic acid, 1.4 wt. % linoleic acid)

b. mixture of fatty acids obtained by hydrolytic splitting of cocoa butter (ca. 24.4 wt. % palmitic acid, 35.4 wt. % stearic acid, 38.1 wt. % oleic acid, 2.1 wt. % linoleic acid)

c. mixture of fatty acids obtained by hydrolytic splitting of lard (ca. 1.3 wt. % myristic acid, 28.3 wt. % palmitic acid, 11.9 wt. % stearic acid, 0.2 wt. % tetradecenoic acid, 2.7 wt. % hexadecenoic acid, 47.5 wt. % oleic acid, 6.0 wt. % linoleic acid, 2.1 wt. % $C_{20}+C_{22}$ unsaturated fatty acids)

d. mixture of fatty acids obtained by hydrolytic splitting of beef tallow (ca. 6.3 wt. % myristic acid, 27.4 wt. % palmitic acid, 14.1 wt. % stearic acid, 49.6 wt. % oleic acid, 2.5 wt. % octadecenoic acid)

e. mixture of fatty acids obtained by hydrolytic splitting of cottonseed oil (ca. 1.4 wt. % myristic acid, 23.4 wt. % palmitic acid, 1.1 wt. % stearic acid, 1.3 wt. % arachidic acid, 0.1 wt. % tetradecenoic acid, 2.0 wt. % hexadecenoic acid, 22.9 wt. % oleic acid, 47.8 wt. % linoleic acid)

f. mixture of fatty acids obtained by hydrolytic splitting of peanut oil (ca. 0.5 wt. % myristic acid, 8.0 wt. % palmitic acid, 4.4 wt. % stearic acid, 2.4 wt. % arachidic acid, 3.1 wt. % behenic acid, 1.1 wt. % lignoceric acid, 1.7 wt. % hexadecenoic acid, 52.5 wt. % oleic acid, 26.3 wt. % linoleic acid)

g. mixture of fatty acids obtained by hydrolytic splitting of palm oil (ca. 1.6 wt. % myristic acid, 32.3 wt. % palmitic acid, 5.5 wt. % stearic acid, 52.4 wt. % oleic acid, 8.2 wt. linoleic acid)

h. mixture of fatty acids obtained by hydrolytic splitting of sunflower oil (ca. 3.6 wt. % palmitic acid, 2.9 wt. % stearic acid, 0.6 wt. % arachidic acid, 0.4 wt. % lignoceric acid, 34.0 wt. % oleic acid, 57.5 wt. % linoleic acid)

i. mixture of fatty acids obtained by hydrolytic splitting of corn oil (ca. 13 wt. % palmitic acid, 4 wt. % stearic acid, 29 wt. % oleic acid, 54 wt. % linoleic acid)

j. mixture of fatty acids obtained by hydrolytic splitting of safflower oil (ca. 6.4 wt. % palmitic acid, 3.1 wt. % stearic acid, 0.2 wt. % arachidic acid, 13.4 wt. % oleic acid, 76.9 wt. % linoleic acid)

total $C_{20}-C_{24}$ saturated linear acyl group content, in wt. % parts by weight

EO=ethylene oxide, PO=propylene oxide; 5 moles EO per mole trimethylolpropane reacted first, followed by 10 moles PO per mole trimethylolpropane to form alkoxylated polyol having "block" structure PO=propylene oxide; BO=1,2-butene oxide; added as 3:1 mole:mole mixture to form alkoxylated polyol having random structure PO=propylene oxide, EO=ethylene oxide; 16 moles PO per mole polyol reacted first, followed by 8 moles EO per mole polyol to form alkoxylated polyol having "block" structure

I claim:

1. A process for producing a reduced calorie lipid composition comprising contacting a triglyceride containing at least one $C_{20}-C_{24}$ saturated linear acyl group with an esterified alkoxylated polyol containing at least one $C_6-C_{18}$ acyl group in the presence of a basic catalyst for a time and at a temperature effective to interchange at least one $C_{20}-C_{24}$ saturated linear acyl group and at least one $C_6-C_{18}$ acyl group.

2. The process of claim 1 wherein the triglyceride contains flat least two $C_{20}-C_{24}$ saturated linear acyl groups.

3. The process of claim 1 wherein the triglyceride contains three $C_{20}-c24$ saturated linear acyl groups.

4. The process of claim 1 wherein the $C_{20}-C_{24}$ saturated linear acyl group has the structure

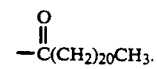

5. The process of claim 1 wherein the esterified alkoxylated polyol is comprised of a polyol residue derived from a polyhydric aliphatic compound and from 2 to 8 fatty acid-esterified oxyalkylene groups attached to said polyol residue.

6. The process of claim 5 wherein said fatty acid-esterified oxyalkylene groups have the general structure

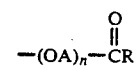

wherein OA is an oxyalkylene unit derived from a $C_2-C_{10}$ epoxide, n is from 1 to 20, and

is an acyl group derived from a $C_6$–$C_{18}$ saturated or unsaturated fatty acid.

7. The process of claim 5 wherein the polyhydric aliphatic compound is selected from $C_2$–$C_{10}$ aliphatic diols, $C_3$–$C_{12}$ aliphatic triols, pentaerythritol, sugar alcohols, monosaccharides, disaccharides, and alkyl glycosides.

8. The process of claim 6 wherein the $C_2$–$C_{10}$ epoxide is selected from ethylene oxide, propylene oxide, 1,2-butylene oxide, and mixtures thereof.

9. The process of claim 6 wherein the $C_6$–$C_{18}$ saturated or unsaturated fatty acid is selected from caproic acid, caprylic acid, capric acid, lauric acid, myristic acid, palmitic acid, palmitoleic acid, stearic acid, undecanoic acid, pelargonic acid, heptadecanoic acid, pentadecanoic acid, tridecanoic acid, oleic acid, capriolic acid, lauroleic acid, elaidic acid, vaccenic acid, myristoleic acid, linoleic acid, and linolenic acid.

10. The process of claim 1 wherein the basic catalyst is an alkali metal, alkali metal compound, or alkaline earth compound.

11. The process of claim 1 wherein the temperature is from 0° C. to 2750° C.

12. The process of claim 1 wherein the weight ratio of the triglyceride to the esterified alkoxylated polyol is from 20:1 to 1:20.

13. A process for producing a reduced calorie lipid composition comprising contacting (a) a triglyceride containing at least two $C_{20}$–$C_{24}$ saturated linear acyl groups having the general structure

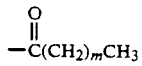

wherein m is 18, 20, or 22 with (b) an esterified alkoxylated polyol comprised of a polyol residue derived from a polyhydric aliphatic compound and from 2 to 8 fatty-acid-esterified oxyalkylene groups attached to said polyol residue having the general structure

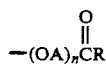

wherein OA is an oxyalkylene unit derived from a $C_2$–$C_{10}$ epoxide, n is from 1 to 20, and

is an acyl group derived from a $C_6$–$C_{18}$, saturated or unsaturated fatty acid in the presence of (c) a catalytically effective amount of an alkali metal, alkali metal compound, or alkaline earth compound at a temperature of from 0° C. to 275° for a time effective to interchange at least one of the $C_{20}$–$C_{24}$ saturated linear acyl groups and at least one of the acyl groups derived from a $C_8$–$c_{18}$ saturated or unsaturated fatty acid.

14. The process of claim 13 wherein said triglyceride is obtained by hydrogenation of a vegetable oil selected from high erucic rapeseed oil and meadow foam oil.

15. The process of claim 13 wherein the alkali metal, alkali metal compound, or alkaline earth compound is selected from sodium alkoxides, potassium alkoxides, sodium hydroxide, potassium hydroxide, sodium metal, potassium metal, and sodium-potassium alloys.

16. The process of claim 13 wherein the polyhydric aliphatic compound is selected from $C_2$–$C_{10}$ aliphatic diols, $C_3$–$C_{12}$ aliphatic triols, pentaerythritol, sugar alcohols, monosaccharides, disaccharides and alkyl glycosides.

17. The process of claim 13 wherein the polyhydric aliphatic compound is glycerin.

18. The process of claim 13 wherein the $C_2$–$C_{10}$ epoxide is ethylene oxide, propylene oxide, 1,2-butylene oxide, or a mixture thereof.

19. The process of claim 13 wherein the $C_6$–$C_{18}$, saturated or unsaturated fatty acid is selected from caproic acid, caprylic acid, capric acid, lauric acid, myristic acid, palmitic acid, palmitoleic acid, stearic acid, undecanoic acid, pelargonic acid, heptadecanoic acid, oleic acid, caprioleic acid, pentadecanoic acid, tridecanoic acid, lauroleic acid, elaidic acid, vaccenic acid, myristoleic acid, linoleic acid, and linolenic acid.

20. The process of claim 13 wherein said esterified alkoxylated polyol is obtained by base-catalyzed alkoxylation of the polyhydric aliphatic compound with an epoxide selected from ethylene oxide, propylene oxide, 1,2-butylene oxide, and mixtures thereof to yield an alkoxylated polyol and esterification of the alkoxylated polyol with a mixture of fatty acids obtained by hydrolytic splitting of a lipid selected from cottonseed oil, soybean oil, peanut oil, olive oil, safflower oil, sunflower oil, low erucic rapeseed oil, palm oil, palm kernel oil, tallow, lard, cocoa butter, coconut oil, sesame oil, corn oil, and hydrogenated derivatives thereof.

21. A process for producing a reduced calorie lipid composition comprising contacting a triglyceride containing at least two $C_{20}$ or $C_{24}$ saturated linear acyl groups obtained by hydrogenation of a vegetable oil selected from high erucic rapeseed oil and meadowfoam oil with (b) an esterified alkoxylated glycerin comprised of 3 fatty acid-esterified oxyalkylene groups having the general structure

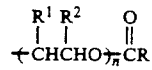

attached to a glyceryl residue wherein $R^1$ and $R^2$ are the same or different and are hydrogen, methyl, or ethyl, n is from 1 to 6 and

is an acyl group derived from a $C_6$–$C_{18}$ saturated or unsaturated fatty acid in the presence of (c) a effective amount of a catalyst selected from sodium alkoxides, potassium alkoxides, sodium hydroxide, potassium hydroxide, sodium metal, potassium metal, and sodium-potassium alloys at a temperature of from 50° C. to 200° C. for a time effective to interchange at least one of the $C_{20}$ or $C_{24}$ saturated linear acyl groups and at least one of the acyl groups derived from a $C_6$–$C_{18}$ saturated or unsaturated fatty acid.

* * * * *